United States Patent [19]
Zahavi et al.

[11] Patent Number: 5,661,748
[45] Date of Patent: Aug. 26, 1997

[54] LASER PULSE EXTENDER

[76] Inventors: Dov Zahavi, 18 Eilat Street, Haifa 32298; Natalie Levinsohn, 10 Hatmarim Street Bet Eliezer, Hadera 38481, both of Israel; Shay Ghilai, 55a Ir Shemesh Street, Tel-Aviv, Israel; 69352

[21] Appl. No.: 593,255

[22] Filed: Jan. 29, 1996

[30] Foreign Application Priority Data

Feb. 6, 1995 [IL] Israel ..................................... 112546

[51] Int. Cl.[6] ................................................ H01S 3/08
[52] U.S. Cl. ........................... 372/108; 372/99; 372/98; 372/100; 372/92; 372/700
[58] Field of Search ............................ 372/99, 98, 700, 372/92, 100, 107, 108

[56] References Cited

U.S. PATENT DOCUMENTS 5,243,465 9/1993 Fein ........................................ 359/636

*Primary Examiner*—Leon Scott, Jr.
*Attorney, Agent, or Firm*—Edwin D. Schindler

[57] ABSTRACT

A device for extending the duration of a light pulse by a factor of an integer or by a factor which differs from an integer. The light pulse is passed through a device which divides the initial beam into a number of parts, where the first part passes unhindered while the subsequent parts of the beam are retarded and pass through the system after various delay periods, resulting in the desired extension of the pulse duration. The basic components of the novel device are spherical mirrors facing each other, a special reflector and a translation plate.

6 Claims, 5 Drawing Sheets

LASER PULSE EXTENDER

FIELD OF THE INVENTION

The present invention relates to means and method for extending the duration of a high energy laser pulse by a desired factor, up to about 8 times or more the duration of the original pulse. This device is simple and inexpensive and provides a convenient solution of this aim, which has been dealt with hitherto with certain problematic solutions only.

BACKGROUND

Several laser types emit their energy in the form of short pulses. For certain applications, it is necessary to utilize this energy with an extended pulse length (and correspondingly reduced peak power).

This is usually true for high energy pulses. With these lasers, the energy distribution within the beam cross section can change from pulse to pulse, and it is usually necessary to homogenize the energy distribution within the beam cross section.

Several approaches have been considered in order to change the time/power relationship of the pulse. One was to change the modulation of the laser itself, but this is sometimes limited by the discharge physics and thus an optical method is needed.

The traditional approach to extend the pulse width is to use a combination of partial reflectors to divide the energy and then reflect the various portions, after they have traveled a certain distance, thus accumulating the necessary delays. Let's consider, as an example of this method, the case of extending the pulse width by 3. The first partial reflector will have a reflection coefficient of close to 33%, thus, 67% of the energy will pass on until they reach, after a delay corresponding to a full pulse width, the next partial reflector with a reflection coefficient of 50%.

50% of this energy, that is, about 33% of the total energy, will be reflected back (to follow the first 33% reflected by the first reflector).

The last 33% of the energy will pass through the second reflector, and after a further delay equal to a pulse width, will reach a 100% reflection to follow the first two portions.

These two last portions, on their way back, will have to pass through the partial reflectors and each will lose a portion of the energy to secondary division (the 33% reflected by the second reflector will have to pass through the 33% first reflector, but only 67% of this energy will pass on). This secondary reflection will appear as a "tail" of gradually diminishing intensity.

The advantage of this system is that by using flat partial reflectors, it is not sensitive to energy distribution variations.

The long delays also require that some compensation means for the beam divergence be incorporated (such as using concave reflectors to effect the delay), and thus make the delay an imaging rather than a plain transmission scheme.

The inherent disadvantage of this system is the percentage of energy transferred to the "tail", due to secondary reflections. Usually, this energy cannot be utilized and represents a significant loss.

SUMMARY OF THE INVENTION

The invention relates to a device for the extension of a short light pulse by a desired factor, of up to about 8 times or more the duration of the original light pulse, depending on the specific device. The invention further relates to a method of light pulse extension, and especially the extension of brief light pulses.

The device and method are intended for extending the duration of specially, very brief light pulses, such as those from high power lasers.

Essentially the device is such that the pulse of light is reflected a number of times, with translation of the light beam by a given "step" during each passage. The novel devices have substantial advantages, and the main one is the very small energy loss during this process of light pulse duration extension. Essentially a device according to the present invention comprises two spherical reflectors facing each other with a common optical axis, a special reflector divided into a sequence of transparent and reflecting elements parallel with each other, of predetermined width, which may be equal or different between transparent and reflecting elements, which reflect at a 45° angle with the reflector so as to provide the desired translation, for each of the passages of part of the light beam, so that part of the light beam incident on the reflector at 90° with the optical axis passes through the reflector in an unhindered manner, while part of the beam passes at least once between the spherical reflectors before passing in the same direction, with a predetermined time delay.

According to a preferred embodiment the special reflector comprises a sequence of transparent parallel bands and between these a sequence of reflective bands, where the width of the reflective bands is a fixed multiple of that of the transparent bands in each specific special reflector.

The ratio between the width of transparent to reflective bands is as desired, preferably 1:2, 1:3 or 1:4 but it can be any desired number and preferably the dimensions of the translation plate are such as to transfer the incidence of the part of the beam coming from the one direction is translated by the width of one zone. The reflecting elements are preferably reflecting bands on a transparent substrate, or the reflective elements are reflective prisms.

Important advantages of the invention are:
 a. Almost no energy loss to the "tail".
 b. A small number of optical elements.
 c. Simple calibration procedure.

The invention is illustrated by way of example with reference to the enclosed schematical drawings, not according to scale, in which.

Figure 1:
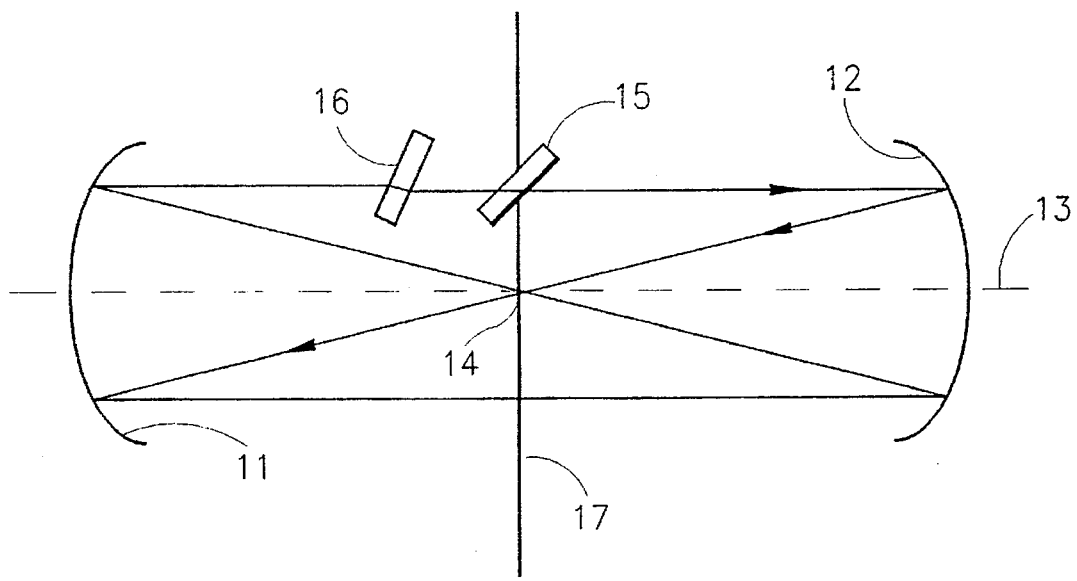
FIG. 1 is a scheme of a pulse extender device.

To aid in the understanding of the invention: for example in a three-fold pulse duration extension, as set out in FIGS.

3 to 6, the following happens: One third of the incoming beam passes through the transparent parts of the pattern, and this due to the fact that the width of the reflective stripes is twice that of the transparent ones (2:1).

The remaining energy circulates, and as due to the translation plate the beam is shifted by the width of the transparent stripes, half passes through out of the remaining $\frac{2}{3}$, and thus $\frac{1}{3}$ of the energy exits the system; The last third again circulates, is shifted by the translation plate and thus exits also.

The angle of the translation plate and its index of refraction determine the extent of the translation of the beam, and this is chosen as set out above.

For a 4-fold extension of pulse duration, the system of FIGS. 7 to 10 can be used comprising two sizes of prisms, of a 1:2 size ratio and transparent passages inbetween. If the small prisms are of 1 mm size, the large ones are of 2 mm and the free passage also 1 mm. As shown in the Figures, $\frac{1}{4}$ of the energy passes immediately, $\frac{3}{4}$ circulates. After 10 nSec a further $\frac{1}{4}$ exits, after 30 nSec another $\frac{1}{4}$ after 50 nSec the 3rd $\frac{1}{4}$ and after 70 nSec the last $\frac{1}{4}$ of the energy exits the system. Also here the translation plate shifts the beam respective the horizontal, in this example by 1 mm (the size of the small prism).

Figure 2:
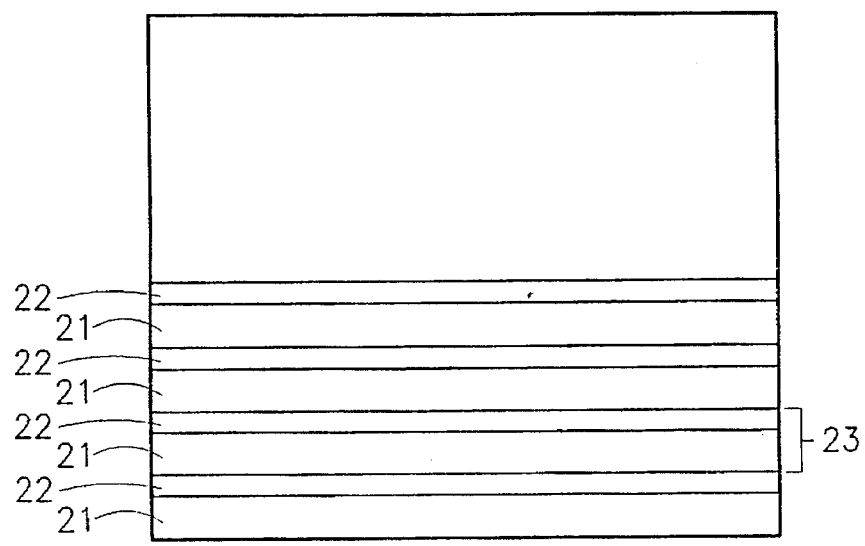
FIG. 2 illustrates a special reflector coating.

As shown in FIG. 1, a pulse extender according to the invention comprises two spherical mirrors, 11 and 12, facing each other on a common axis, 13 and pass through focus 14, a special reflector 15, and a translation plate 16. The incoming beam 17 undergoes reflections as indicated by the beam paths, with an off-set due to the presence of the translation plate 16. A special reflector, for use in the device of FIG. 1, is illustrated in FIG. 2, where a rectangular plate comprises a plurality of consecutive reflector zones 21 and transmission zones 22, two of these, 21 and 22, defining the reflector period 23. Only some of the zones are shown.

The incoming pulse reaches the special reflector, which is a flat plate, coated on one side by a repetitive pattern shown in FIG. 2.

The reflector period is much smaller (e.g. $\frac{1}{20}$) than the beam width, and when the beam reaches the reflector, only the portions that reach the transmission zones pass through. The ratio between the reflection zone width and the transmission zone width determines the energy division ratio and, as will later be shown, the pulse extension factor.

Because the reflector period is much smaller than the beam dimensions, the percentage of energy transmitted through is quite insensitive to energy distribution variation.

Those portions of the incoming beam reaching the reflecting zones are deflected at a 90° angle (because the special reflector is tilted at 45° respective the beam) and reaches the right hand side spherical reflector of FIG. 1.

The spherical reflectors are symmetric to the incoming beam axis and their foci are located on this axis.

As the beam hits the first reflector, it focuses on the center point (on the axis) and then it diverges again until it reaches the second reflector. Because the beam comes to this reflector through its focus, it is reflected back—collimated—back to the first reflector.

This process is repeated and the beam returns to the other side of the special reflector. The focal lengths of these reflectors are such, that the entire route represents the required delay (equal or greater than the pulse width).

Because the special reflector is tilted 45° to the incoming beam axis, and the axes of both spherical reflectors are perpendicular to this axis, the portions of the beam coming to the back side of the reflector (after the delay) are imaged on the back side of the reflective zones. These zones are equally reflective on both sides.

Before reaching the special reflector, the beam passes through a translation plate. This is a flat transparent plate of a finite thickness. The plate is tilted relative to the beam axis, so that as the beam passes through the plate, it is somewhat shifted in space without change in direction (this is done in a part where the beam is collimated).

The shift is a function of plate thickness, refraction index and tilt. It causes parts of the reflected beam not to hit the reflective zones, but to pass through the transmission (for another round).

The part hitting the reflective zones follows the first portion of the pulse, (which passed directly on reaching first the special reflector). The next round repeats this process.

Apart from absorption losses and some reflections due to imperfection of transmissive properties of the transparent elements, no energy is lost to the "tail".

This scheme functions as it is for extensions of the pulse length by a factor of 2 or 3. For larger extensions, the special reflector will have to be modified to enable the reflected beam to pass with the proper relations. This can be done by using as non-planar special reflector, a "venetian blind" stepped reflector.

As shown in FIGS. 7 to 10, a system for 4-times pulse extension comprises a venetian blind stepped reflector, of a number of different size prisms, 71 and 72, with transmission zones 73, reflective zones 74 and transparent zones for recirculation beams, 34. The reflective zones 33 are at an angle of 45° to the beam 35.

Figure 4:
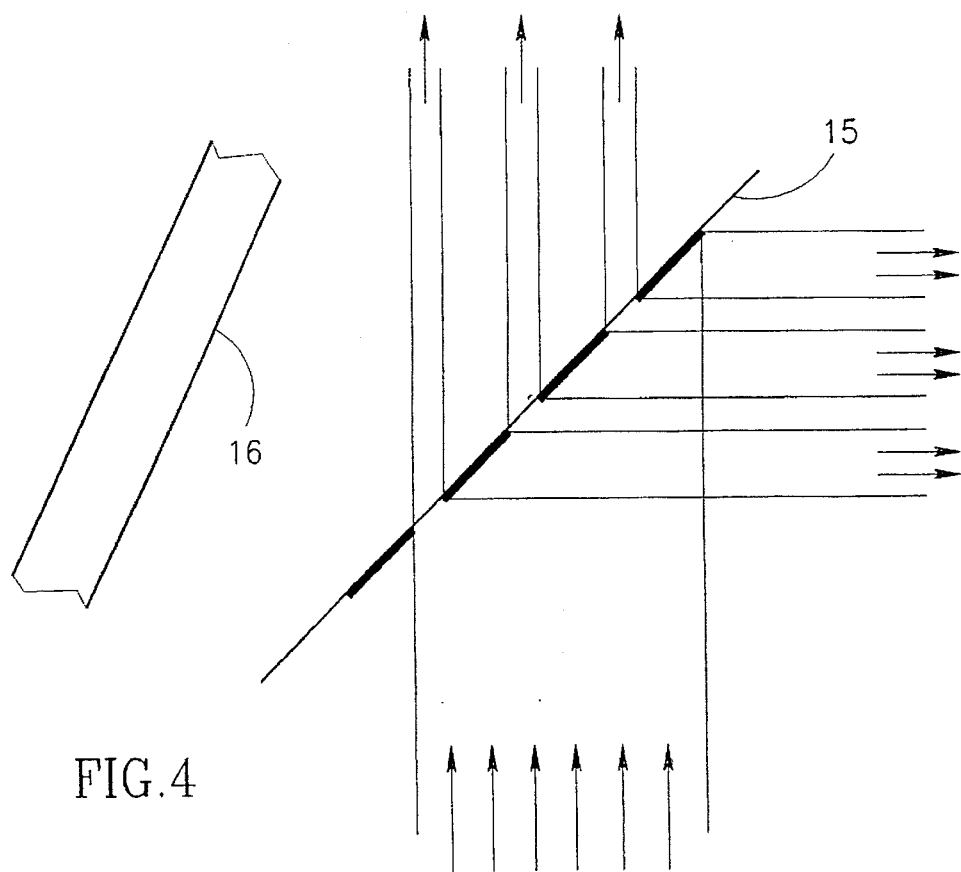
FIG. 4 illustrates the beam configurant about the reflector zone after 10 nsec.
Figure 5:
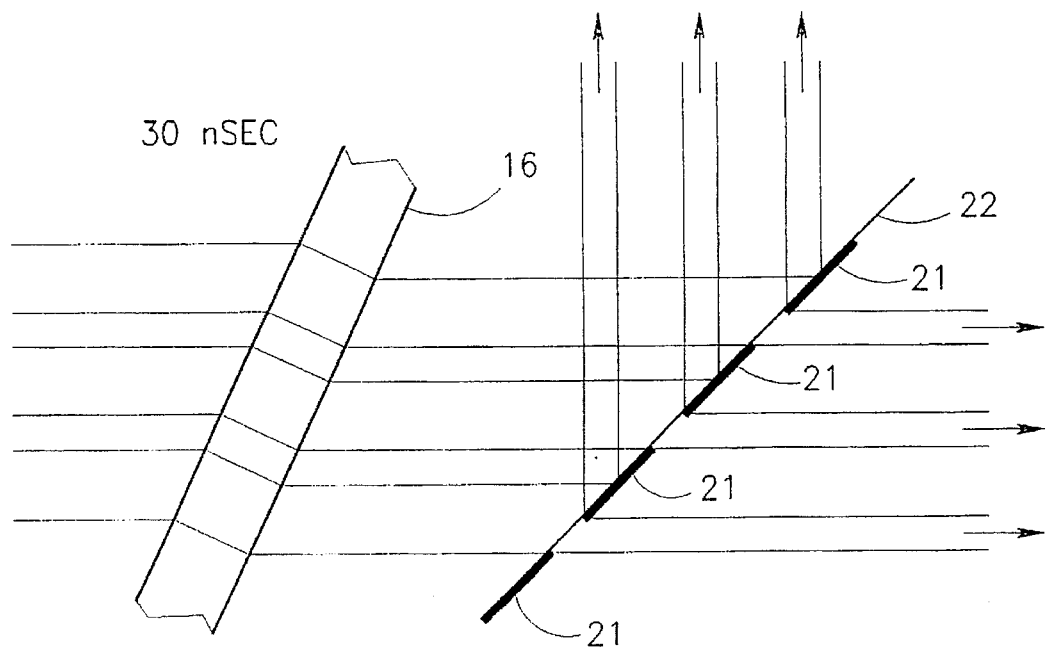
FIG. 5 illustrates the beam configurant about the reflector zone after 30 nsec.
Figure 6:
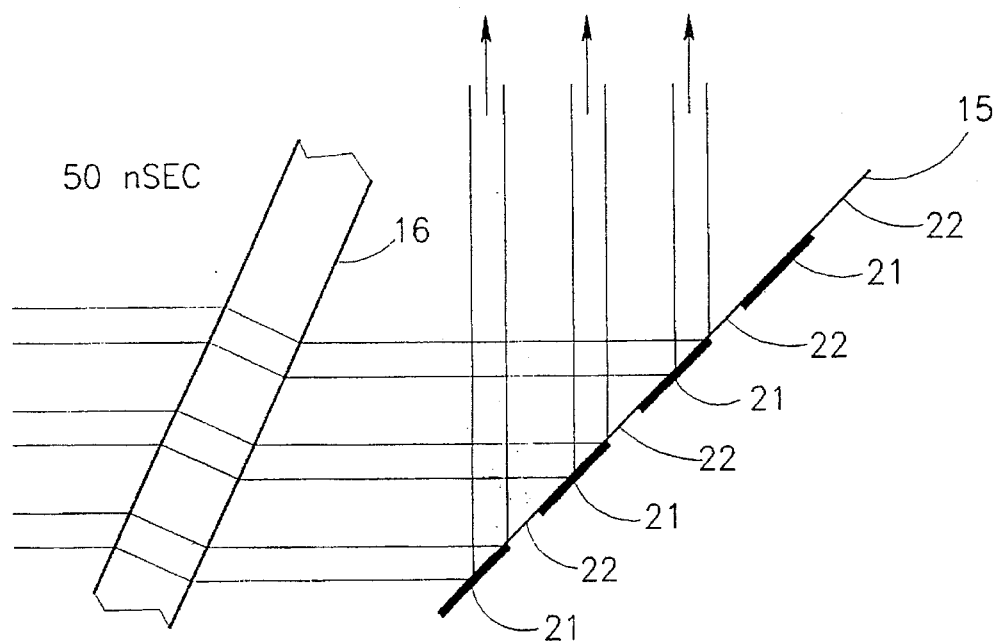
FIG. 6 illustrates the beam configurant about the reflector zone after 50 nsec.
Figure 7:
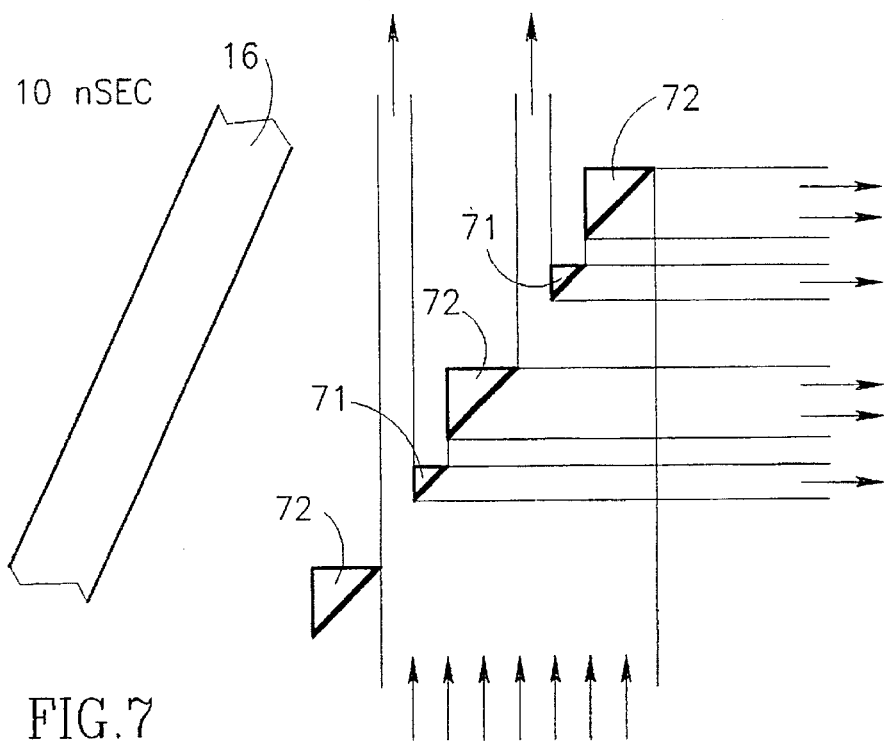
FIG. 7 illustrates a 4-times pulse extender, beam configuration after 10 nsec.
Figure 8:
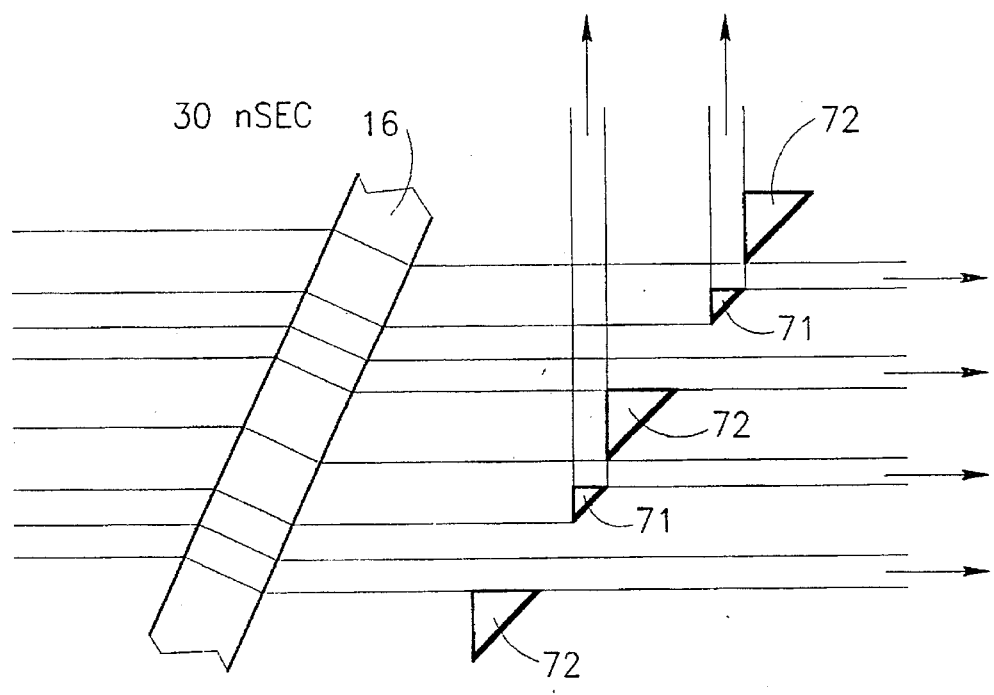
FIG. 8 illustrates the extender of FIG. 7, position after 30 nsec.
Figure 9:
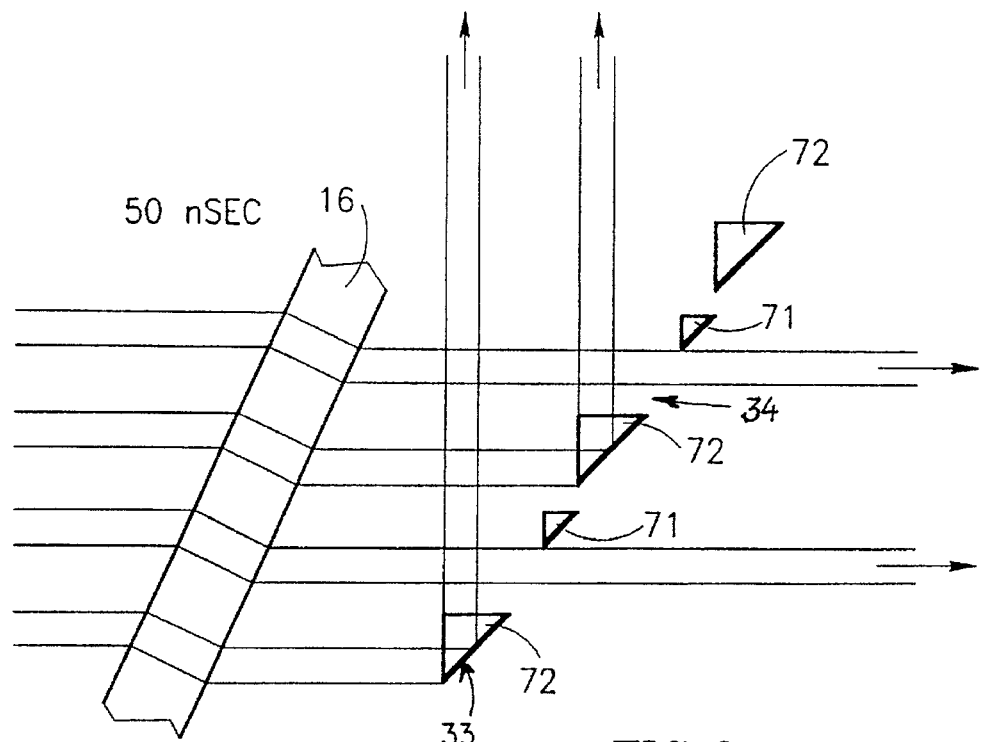
FIG. 9 illustrates the position after 50 nsec.
Figure 10:
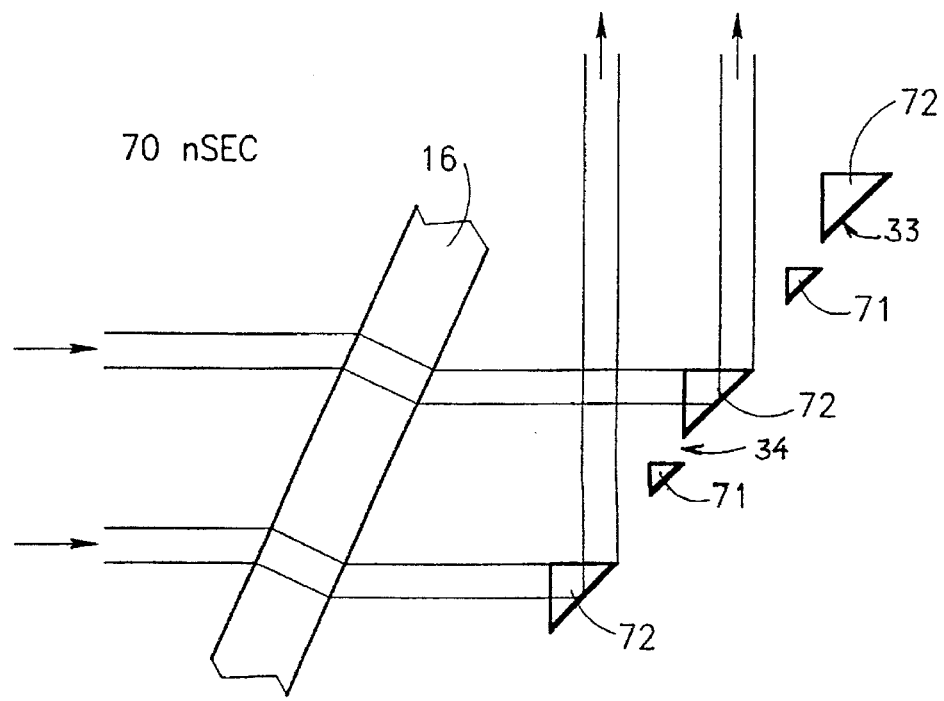
FIG. 10 illustrates the position after 70 nsec.

FIGS. 4 to 6 illustrate the path of the light beam during various stages, after 10 nSec, after 30 nSec and after 50 nSec, respectively.

In order to provide a better understanding, the parts of the system through which light passes in each of these situations, is shaded.

Figure 3:
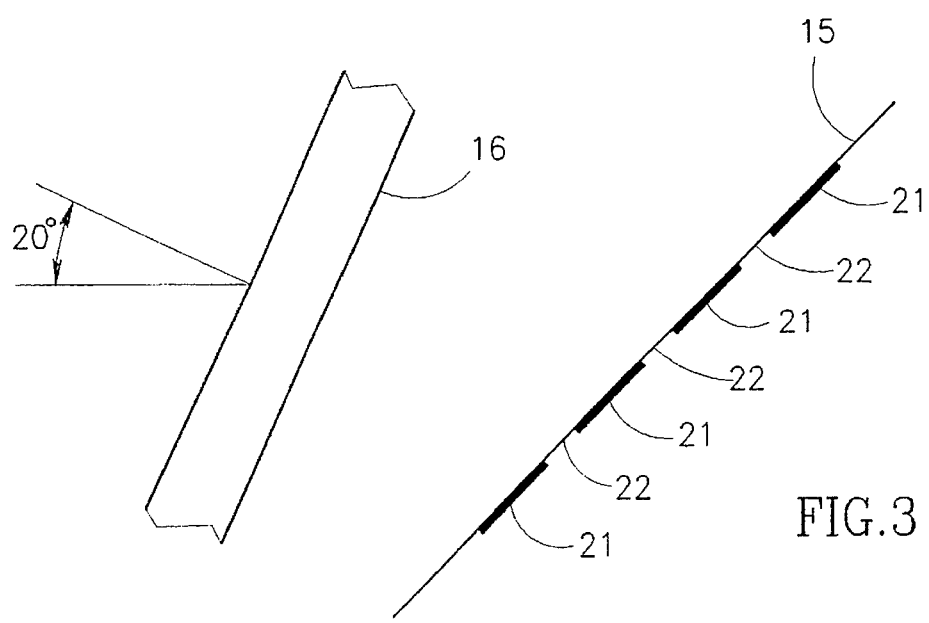
FIG. 3 illustrates part of a system for 3 times pulse extension.

The FIGS. 4 to 6, are enlargements of the central part of FIG. 1, and there is shown only in a schematical manner part of the special reflector 15 and part of the translation plate 16, as illustrated in FIG. 3. It is apparent that the light incident on the transparent strips passes through, whereas light incident on the reflective stripes is reflected.

FIG. 3 illustrates part of a device for a 3 fold extension of pulse duration. The reflector is shown as having zero thickness, which only for the sake of clarity. In reality the beam translation is partly due to the passage through the reflector, and partly due to the passage through the translation plate.

The translation of the part of the light beam passing through these results in a shift respective the optical axis, and by a design which results in a predetermined lateral shift, a desired part of the beam is passed through the transparent sections of the reflector plate.

FIG. 4 illustrates the situation after 10 nSec. The incoming beam is divided, and the parts reaching the transparent zones pass through and exit in the direction of the arrows. The parts of the beam reaching the reflecting parts are reflected to the right. During the entire sequence the beam passes the path indicated in FIG. 1. After 30 nSec the situation is as shown in FIG. 5. The incoming part of the beam has completed part of its circulation, and now arrives from the left to the right, parallel to the optical axis. Before arriving at the special reflector, they pass through the translation plate and emerge again parallel to the optical axis, but with a translation so that when they reach the reflector, parts 44 are deflected towards the exit while parts 45 continue for an additional circulation.

The remaining parts of the initial light beam, after a further 20 nSec, are shown in FIG. 6, arriving again from the left, undergoing translation by the translation plate, and reach the exit. Thus, the net result is a 3-fold extension of the pulse duration, obtained by simple optical means.

As shown in FIGS. 7 to 10, a system for 4-times pulse extension comprises a venetian blind stepped reflector, of a number of different size prisms, 71 and 72, with transmission zones 73, reflective zones 74 and transparent zones for recirculation beams, 34. The reflective zones 33 are at an angle of 45° to the beam 35.

FIGS. 7 to 10 illustrate a similar sequence resulting in a 4-fold pulse extension. The special reflector comprises two sets of elongated prisms with reflective coatings at their diagonal surfaces. Part of the prisms 71 are of unit dimension, X, whereas the other part (equal number) 72 are double this size, i.e. 2x. If the unit dimension is 0.43 mm, the larger prisms are double (0.86 mm) and the dimensions of the translation plate and the refractive index of this plate is chosen in such a manner than the deflection of the beam while passing through this plate, is by 0.86 mm.

The arrangement of the prisms in space is alternating between unit size prisms, and double size prisms, and thus resulting in an arrangement such as:

| Prism Type | Vertical gap between top of prism to bottom of the next prism | Horizontal gap between end of prism to start of of the next prism |
| --- | --- | --- |
| Double | Double | Single |
| Single | Single | None |
| Double | Double | Single |
| Single | Single | None |

This repetitive arrangement continues as above.

With this reflector, the reflective zones are still tilted at 45° to the beam axis, but they are set apart in the vertical direction, so that the larger portion of the beam, recirculating, can pass through.

The arrangement of the spherical reflectors assures that the recirculating beam is imaged, and that its natural divergence does not increase with delay.

Numeric Example

We shall calculate values for times three and times four extensions. The delay element is unaffected by the extension and is determined mostly by the pulse width. So, we shall first calculate the delay and later the special reflectors required for each case.

1. Delay Generation

Let us consider a laser with a pulse duration of 20 nSec. At the speed of light this equals 6 meters. During its travel between the reflecting mirrors the light travels slightly more than four times the distance between the mirrors and therefore the distance between the mirrors should be 6/4=1.5 meters. The special reflector will be placed close to the center, that is about 75 cm from each mirror. The translation plate will be located 10 cm behind the reflector.

2. Reflector Period

The reflector period is determined by the beam dimensions and by the homogenizer design.

Let us assume a beam of 10×30 mm and a homogenizer cell size of 5×5 mm. As the reflector crosses this beam at 45° we should consider its dimension as 30/Sin 45°=42.4 mm. A reflector period of 2.4 mm would insert at least 3 periods into each homogenizer cell (ensuring good homogenization) and will divide the beam into 42.4/2.4>17 samples also a reasonable number reducing the sensitivity to energy distribution variations. This period is also well within easy manufacturing range.

3. Times 3 Extension

To extend the pulse to 75 nSec we need to have a reflection zone twice as wide as the transmission zone, letting a third of the energy through. Thus the transmission zone will be 2.4/3=0.8 mm wide and the reflection zone will be 1.6 mm wide.

3.1 Translation

Each circulation the beam needs to Shift its position by a third of the reflector period. As the shift is only in the vertical dimension, we get for the vertical translation 2.4/3×Sin 45°=0.565 mm. This translation is achieved partly by the translation plate and partly by the plate used for the special reflector (this reflector is built on a transparent plate and the beam crossing it is shifted) this shift is not negligible but for the sake of clarity we will treat the entire shift as though it is caused only by the translation plate (that is equivalent to using a reflector of zero thickness).

Let us assume a 5 mm thick translation plate with a refraction coefficient of 1.5. To get a translation of 0.565 mm this plate must be titlted 20° from the vertical axis.

In FIG. 1 we can see a schematic diagram, not to scale, showing the translation plate and the—zero thickness— special reflector.

4. Times 4 Extension

The calculations of the delay and the reflector period remain unchanged. The reflector design requires that a quarter of the beam is reflected out on each circulation (or the first quarter goes directly out and another quarter on each circulation). Another requirement is that three quarters of the recirculating beam pass through the reflector after the first circulation. There are several solutions to this requirement and in FIG. 5 we can see the developing situations after 10,30,50 and 70 nSec. We can see that the special reflector in this solution is constructed of several elongated reflecting prisms fixed in space so that the reflecting surfaces are tilted 45° to the incoming beam (and to the delayed beams) the horizontal spacings between the prisms allow a quarter of the energy to pass directly out and the vertical spacings are either a quarter or half of the reflector period, allowing passage of parts of the delayed beams to pass for recirculation.

4.1 Dimensions

We have already stated that the reflector period need not change. When viewed along the axis of the incoming beam this period (2.4×Sin 45°=1.7 mm) is split into 4—a single reflecting zone, a double reflecting zone and a transparent zone—this means that each such "subzone" is 1.7/4=0.43 mm wide.

This will define the following dimensions:

Single reflector leg 0.43 mm (and the reflecting zone is its diagonal 0.6 mm wide).

Double reflector leg 0.85 mm (and the reflecting zone is its diagonal 1.2 mm wide).

Horizontal spacing between single and double reflector 0.43 mm and 0.

Vertical spacing between single and double reflector 0.43 mm and 0.85 mm.

4.2 Translation

As can be seen in FIG. 5 the vertical translation is equal to the double reflector leg, that is 0.85 mm.

In this realisation we ignore translation due to the reflector thickness and the entire translation is done by the plate. If we use the same design of plate we will have to tilt it 30.7° to get the required translation.

It is possible to design a device according to the present invention by means of which it is possible to extend the pulse duration by a factor different from an integer. The following describes how to extend pulse druation by a factor of 1.5 times, and this illustrates how such extension can be made by any desired factor.

There exist practically two functions, the first of which determines the energy ratios and here the determining factor is the special reflector; the second is determined by the time delay and this is a function of the distance between the two curved reflectors (spherical, parabolic) which face each other.

For example, for a pulse extension by a factor of 1.5 there may be used, amongst others, two following systems:

a. To use a reflector of the type used for a 2-times pulse extender, but to fix the mirrors at a distance which correspnds to a delay of half the pulse width, and thus half the energy will exit immediately and the other half will be delayed by half a pulse width at the exit. This is illustrated with reference to FIG. 3 which shows the energy distribution at various stages of the transmission of a pulse.

b. Another possibility of pulse extension by a factor of 1.5 times is to use a special reflector which will allow an initial passage of two thirds of the pulse energy and after the delay, passage of the residual energy.

This illustrates the principle of pulse extenders by a factor which differs from an integer.

We claim:

1. Apparatus for extending the duration of a light pulse, comprising:

two spherical reflectors facing each other with a common optical axis;

a reflector divided into a sequence of transparent elements and reflecting elements parallel with each other, placed at a 45°-angle with an optical axis; and, a translation plate at an angle with said reflector for providing a desired translation vertical with respect to a common optical axis, for each passage of a part of a light beam, so that part of the light beam, incident upon said reflector at an angle of 90° with the optical axis, passes through said reflector without hindrance, while part of the light beam passes at least once between said spherical reflectors, which are located at a distance from each other resulting in a light path having a length which causes a time delay, before exiting in the same direction as its entry after said time delay, said reflector being larger than the cross-section of the light beam and with said reflector being placed in the path of an entering light beam, and with said translation plate placed in the path of a parallel beam, thereby extending the duration of a light pulse.

2. The apparatus for extending the duration of a light pulse according to claim 1, wherein said reflector comprises a sequence of transparent parallel bands and between the sequence of transparent parallel bands is a sequence of reflective bands, wherein the width of the reflective bands is a fixed multiple of that of the sequence of transparent parallel bands.

3. The apparatus for extending the duration of a light pulse according to claim 2, wherein the ratio between the widths of the transparent parallel bands to the reflective bands is 1:2, 1:3, 1:4 or greater.

4. The apparatus for extending the duration of a light pulse according to claim 1, wherein said translation plate is dimensioned and oriented so that said translation plate produces a translation of the light beam with respect to the optical axis of said two spherical reflectors by the width of stripes of said transparent elements or said reflecting elements of said reflector.

5. The apparatus for extending the duration of a light pulse according to claim 1, wherein said reflecting elements are reflecting bands on a transparent substrate.

6. The apparatus for extending the duration of a light pulse according to claim 1, wherein said reflecting elements are reflective prisms.

* * * * *